(12) United States Patent
Geiser (10) Patent No.: US 8,657,256 B2
(45) Date of Patent: Feb. 25, 2014

(54) VACUUM VALVE

(75) Inventor: Freidrich Geiser, Nuziders (AT)

(73) Assignee: VAT Holding AG, Haag (CH)

( * ) Notice: Subject to any disclaimer, the term of this patent is extended or adjusted under 35 U.S.C. 154(b) by 0 days.

(21) Appl. No.: 13/521,877

(22) PCT Filed: Jan. 7, 2011

(86) PCT No.: PCT/AT2011/000002
§ 371 (c)(1),
(2), (4) Date: Jul. 12, 2012

(87) PCT Pub. No.: WO2011/088482
PCT Pub. Date: Jul. 28, 2011

(65) Prior Publication Data
US 2012/0298904 A1  Nov. 29, 2012

(30) Foreign Application Priority Data

Jan. 25, 2010 (AT) .................................. A 90/2010

(51) Int. Cl.
*F16K 25/00* (2006.01)

(52) U.S. Cl.
USPC ............................. 251/197; 251/204; 251/327

(58) Field of Classification Search
USPC ......... 251/195, 196, 197, 198, 199, 201, 202, 251/203, 204, 326–327
See application file for complete search history.

(56) References Cited

U.S. PATENT DOCUMENTS

| | | | | |
|---|---|---|---|---|
| 165,988 A | * | 7/1875 | Eddy | 251/203 |
| 185,987 A | * | 1/1877 | Thacher | 251/197 |
| 587,107 A | * | 7/1897 | Sherrerd | 137/318 |
| 2,906,491 A | * | 9/1959 | Young | 251/167 |
| 3,198,478 A | * | 8/1965 | Johnston | 251/85 |
| 4,301,993 A | | 11/1981 | Waller | |
| 4,548,386 A | | 10/1985 | Gladisch et al. | |
| 4,560,141 A | | 12/1985 | Bosch | |
| 4,779,649 A | | 10/1988 | Balter | |

(Continued)

FOREIGN PATENT DOCUMENTS

| | | |
|---|---|---|
| CH | 508154 | 7/1971 |
| DE | 455907 | 2/1928 |

(Continued)

*Primary Examiner* — John K Fristoe, Jr.
*Assistant Examiner* — Marina Tietjen
(74) *Attorney, Agent, or Firm* — Volpe and Koenig, P.C.

(57) ABSTRACT

A vacuum valve, including a valve housing, which has a passage having an axis, a seat that surrounds the passage and that lies in a first plane, and a counter seat that surrounds the passage and that lies in a second plane that forms a wedge shape with the first plane, and including a closure device, which can be moved between an open position in which the passage is released and a closed position in which the passage is sealed and which has a closure plate parallel to the first plane and a counter plate parallel to the second plane, and including a valve rod, which has a longitudinal axis and which carries the closure device and which can be moved in a straight line. In order to spread apart the closure plate and the counter plate, the closure device includes a spreading unit, which lies between the closure plate and the counter plate and which can be moved in the closing direction of the valve rod relative to the closure plate and the counter plate, and a support part, which is movably guided relative to the spreading unit and which is connected to the closure plate and/or the counter plate.

8 Claims, 7 Drawing Sheets

(56) References Cited

U.S. PATENT DOCUMENTS

6,056,267 A 5/2000 Schneider
6,367,770 B1 4/2002 Duelli
6,629,682 B2 10/2003 Duelli
7,011,294 B1 3/2006 Ehrne et al.

FOREIGN PATENT DOCUMENTS

| DE | 890589 | 7/1949 |
| DE | 1962121 | 6/1971 |
| DE | 3028786 | 3/1981 |
| EP | 0314832 | 5/1989 |

* cited by examiner

VACUUM VALVE

BACKGROUND

The invention relates to a vacuum valve comprising a valve housing which has a passage having an axis, a seat surrounding the passage located in a first plane, and a counter seat surrounding the passage located in a second plane, with the first and the second planes being arranged to form a wedge-shape in reference to each other and each forming an angle in reference to the axis of the passage, an open position releasing the passage, and a closed position in which the passage is sealed, an adjustable closure device with a closure plate, which in the closed position of the closure device is pressed to the seat and here is aligned parallel in reference to the first plane, and a counter plate, which in the closed position of the closure device is pressed against the counter seat and is here aligned parallel in reference to the second plane, and a valve rod with a longitudinal axis and supporting the closure device, which for the adjustment of the closure device from its open position into its closed position and back is displaceable in a straight line in a closing direction parallel in reference to the longitudinal axis of the valve rod and against the closing direction.

Such a vacuum valve comprising a seat and a counter seat located in first and second planes arranged in a wedge-shape in reference to each other and in the closed state of the vacuum valve pressed against the closure plate and a counter plate is known from U.S. Pat. No. 4,301,993 A. The closure plate and the counter plate are fastened at fastening plates, which are connected to each other via an arched connection plate, engaged by the valve rod. When closing the vacuum valve the fastening plates are first moved by the valve rod and, when the closure plate and the counter plate are positioned opposite the seat and counter seat, hindered by approaching a stop at a counter stop, fixed at the valve housing, from any further motion, subsequently the valve rod impressing into the arched connection plate and thus the closure plate and the counter plate are pressed apart and thereby being slightly deflected and pressed against the seat and the counter seat. In this construction is it hardly possible to keep the production tolerances sufficiently low, and additionally changes of the mutual position of the different parts can develop over time due to use.

A vacuum valve is known from U.S. Pat. No. 6,056,267 A in which the valve rod is fixed at the compression element, which has a diagonal surface, which cooperates with a diagonal surface of the closure device in order to press a closure plate to a seat in the closed state of the vacuum valve. Due to the fact that the closure force has to be transferred via the valve rod a very stiff construction is required, in which the valve rod must be embodied appropriately massively.

A vacuum valve with a wedge-shaped closure member is discernible from U.S. Pat. No. 6,367,770 B1. The closure member comprises lateral surfaces approaching each other in a wedge-shaped fashion, at which seals are arranged, which in the closed state of the valve also contact sealing surfaces of the valve seat arranged wedge-shaped in reference to each other. The closing of the vacuum valve occurs with only little closing force, with in case of an applied differential pressure one of the seals is compressed with one of the sealing surfaces. Another vacuum valve with a wedge-shaped closure member is discernible from U.S. Pat. No. 7,011,294 B1. When closing the vacuum valve the closure member is guided in a gliding fashion in reference to the valve housing by gliding parts arranged at the closure member in the last section of its displacement motion. Another vacuum valve with a wedge-shaped closure member is discernible from U.S. Pat. No. 4,548,386. The wedge-shaped closure member comprises two plates supported by a valve rod. A recess is located therebetween, in which a ring is arranged. The ring and the walls of the recess exhibit a wedge-shaped cross-section. By the wedge-shaped ring arranged in the wedge-shaped recess the plates can be adjusted in their position to the seat and the counter seat of the valve housing. Disadvantages of the vacuum valves of prior art with wedge-shaped closure members are, among other things, that either a sealing of the vacuum valve is achieved only by an applied differential pressure or relatively strong shearing forces are applied upon the respective seal leading to wear and tear of the seal and the production of particles.

Blocking slides are discernible from DE 455907 C and DE 1962121 A1, in which closure plates, arranged wedge-shaped in reference to each other, are pressed against appropriately arranged valve seats by a wedge located therebetween during the closing process.

In slide valves known from U.S. Pat. No. 4,779,649 A the seats for the closure plate and the counter plate are located in parallel planes. The areas of the closure plate and the counter plate facing each other are aligned wedge-shaped in reference to each other and cooperate with a wedge arranged between them, which presses the closure plate and the counter plate against the seat and the counter seat in order to close the valve. The closure plate and the counter plate are impinged by spring elements in the direction towards each other.

Additionally, slide valves are known comprising a closure plate and a counter plate, which are located parallel in reference to each other and with a spreading unit being arranged between them. When closing the vacuum valve the closure plate and the counter plate first are moved by the valve rod in their longitudinal direction and then, upon approaching a stop connected to the closure plate and the counter plate, to a counter stop, fixed at the valve housing are spread apart by the spreading unit engaged by the valve rod, which is further displaced in order to be pressed against the seat and the counter seat of the vacuum valve. For this purpose different embodiments of spreading units are known, as discernible for example from U.S. Pat. No. 4,560,141 A and DE 3 028 786 A1. From the latter publication an embodiment is discernible in which the spreading unit shows a wedge-shaped embodiment and cooperates via interposed rolls with wedge-shaped areas of the closure plate and the counter plate, embodied at sides of the closure plate and counter plate facing each other by way of recesses. With regards to the production tolerances in this construction sufficient stroke must be provided for pressing the closure plate and the counter plate to the seat and the counter seat. However, particles are created over the entire stroke when spreading the plate and the counter plate apart. In order to reduce the stroke very small production tolerances had to be achieved and the stiffness had to be high, which leads to respectively high costs.

SUMMARY

The objective of the invention is to provide a vacuum valve of the type mentioned at the outset, in which only a minor stroke of the closure plate and the counter plate for pressing the closure plate and the counter plate to the seat and the counter seat can be achieved by the spreading unit in a cost-effective embodiment.

In the vacuum valve of the invention the closure plate and the counter plate are located in the closed position of the closure device as well as in its open position parallel in reference to the seat and/or the counter seat, with the planes of the seat and the counter seat and thus also the closure plate and the counter plate being positioned wedge-shaped in reference to each other and each showing an angle in reference to the axis of the passage.

Here, they are inclined in reference to the perpendicular alignment in reference to the axis of the passage by opposite angles, preferably of equal size. Preferably the angles formed by the planes of the seat and the counter seat with the axis of the passage amount to more than 45°, preferably more than 70°. The angle formed by these two planes in reference to each other amounts preferably to less than 45°, particularly less than 20°.

The spreading unit fastened at the valve rod comprises a first spreading surface aligned parallel in reference to the plane of the seat and a second spreading surface aligned parallel in reference to the plane of the counter seat. The first and the second spreading surfaces are therefore parallel in reference to the closure plate and/or the counter plate. In order to spread apart the closure plate and the counter plate in order to press the closure plate to the seat and the counter plate to the counter seat the spreading unit is displaceable in reference to the closure plate and the counter plate in the closing direction of the valve rod, aligned parallel in reference to the longitudinal axis of the valve rod.

When closing the vacuum valve, the valve rod, starting from a first position, in which the closure unit is in its opened position and releases the passage, is displaced in the closing direction aligned parallel in reference to the longitudinal direction of the valve rod to a second position, in which the closure unit is inserted into the passage of the vacuum valve, into a third position, in which the closure unit is in its closed position. Advantageously, in the second position of the valve rod, when the stop of the closure device abuts a counter stop fixed at the valve housing and thus the closure plate and the counter plate are blocked from any further displacement in the closing direction of the valve rod, the closure plate is spaced apart from the seat and the counter plate from the counter seat. In a further displacement of the valve rod from its second position into its third position the spreading unit is displaced in reference to the closure plate and the counter plate in the closing direction of the valve rod and thus the closure plate and the counter plate are spread apart from each other and pressed to the seat and/or counter seat in order to seal the passage.

By the wedge-shaped arrangement of the seat and counter seat as well as the closure plate and the counter plate the distances shown between the closure plate and the counter plate from the seat and/or counter seat in the second position of the valve rod may be designed relatively small, preferably amount to less than 2 mm. The stroke of the plate and the counter plate performed thereby between the second and the third position of the valve rod is therefore appropriately small.

The spreading apart of the closure plate and the counter plate by the spreading unit occurs by a parallel displacement of the closure plate and the counter plate parallel in reference to the passage. By this parallel displacement the mutual distance of the closure plate and the counter plate is increased.

The first and second spreading surfaces of the spreading unit may cooperate directly with the closure plate and/or the counter plate for spreading the closure plate and the counter plate by contacting the respective compression surface of the closure plate and the counter plate. The compression surface of the closure plate is here located parallel in reference to the first plane and the compression surface of the counter plate parallel in reference to the second plane. However, it is also possible to interpose transmission elements between the first and the second spreading surfaces and the closure plate and the counter plate. For example, a roller bearing may be provided for each, with its roller bodies rolling on the one side at the respective spreading surface, and on the other side at the respective compression surface. The cooperation between the first spreading surface and the closure plate and/or between the second spreading surface and the counter plate for spreading apart the closure plate and the counter plate may therefore be indirect as well.

According to the invention, the closure device further comprises at least one support part, guided displaceable in reference to the spreading unit in the direction of the longitudinal axis of the valve rod, which is connected to the closure plate and/or the counter plate in a fixed manner in reference to the direction of the longitudinal axis of the valve rod. This way, an advantageous guidance of the closure plate and the counter plate is achieved.

BRIEF DESCRIPTION OF THE DRAWINGS

Additional advantages and details of the invention are explained in greater detail based on the attached drawings. Shown are.

DETAILED DESCRIPTION OF THE PREFERRED EMBODIMENTS

An exemplary embodiment of a vacuum valve according to the invention is shown in FIGS. 1 to 7. The vacuum valve comprises a valve housing 1 with a passage 2 having an axis 3. In order to connect to other parts of the vacuum arrangement, for example a (respective) vacuum chamber and/or pipelines, the valve housing 1 comprises first and second flanges 4, 5 forming the inlet and outlet opening of the passage 2. The exterior surfaces of the flanges 4, 5 are positioned perpendicular in reference to the axis 3 of the passage 2.

The passage 2 penetrates window recesses in plate-shaped sections 6, 7 of the valve housing 1. At the side facing the plate-shaped section 7, the plate-shaped section 6 forms a seat 8 in the passage 2 and/or the window opening in the area surrounding the plate-shaped section 6 for a closure plate 10 of a closing arrangement 12. The side of the plate-shaped section 7 facing the plate-shaped section 6 forms a counter seat 9 for the counter plate 11 of the closure device 12 in the passage 2 and/or the window opening in the area surrounding the plate-shaped section 7.

The plate-shaped sections 6, 7 are aligned at an angle in reference to each other so that the seat 8 and the counter seat 9 are located in first and second planes 13, 14, which are wedge-shaped in reference to each other and each form an angle to the axis 3 of the passage 2. The first and second planes 13, 14 are here inclined by alignments located by opposite, equally sized angles in reference to an alignment that is perpendicular in reference to the axis 3. The incline in reference to this right-angled alignment occurs here about an axis, which is aligned perpendicular in reference to the longitudinal axis 26 of the valve rod 23 described in the following.

Preferably the angle 15 formed by the first and second planes 13, 14 ranges from 5° to 20°, for example amounts to a value of about 10°.

The closure plate 10 of the closure device 12 is located parallel in reference to a first plane 13. The counter plate 11 of the closure device 12 is located parallel in reference to a second plane 14.

The closure device 12 further comprises a wedge-shaped spreading unit 16 located between the closure plate 10 and the counter plate 11. The spreading unit 16 has a first spreading surface 17 positioned parallel in reference to the first plane 13 and cooperating with the closure plate 10, as well as a second spreading surface 18 positioned parallel in reference to the second plane 14 and cooperating with the counter plate 11. In the exemplary embodiment shown the first spreading surface 17 is formed by the surfaces of gliding inserts 19, which are arranged in the recesses of a basic body 21 of the closure device 12, with the side of the basic body 21 being provided therewith, facing the closure plate 10. The second spreading surface 18 is formed by surfaces of gliding inserts 20, which are arranged in the recesses of the basic body 21, with the side of the basic body 21 being provided therewith facing the counter plate 11.

The gliding inserts 19, 20 are made from a suitable gliding material, for example Teflon. Other gliding materials, preferably comprising plastic, may also be used.

The spreading unit 16 is fastened at the end of a valve rod 23, located at the front in reference to the closing direction 22. For this purpose, in the exemplary embodiment shown the valve rod 23 is screwed to a connector part 24 of the spreading unit 16, which in turn is screwed to the basic body 21 of the spreading unit 16.

The valve rod 23 is arranged perpendicular in reference to the axis 3 of the passage 2. The first and second planes 13, 14 are inclined by opposite, equivalent angles in reference to an alignment parallel reference to the longitudinal axis 26 of the valve rod 23, namely by an axis aligned perpendicular in reference to the longitudinal axis 26 of the valve rod 23 and perpendicular in reference to the axis 3 of the passage 2.

Figure 1:
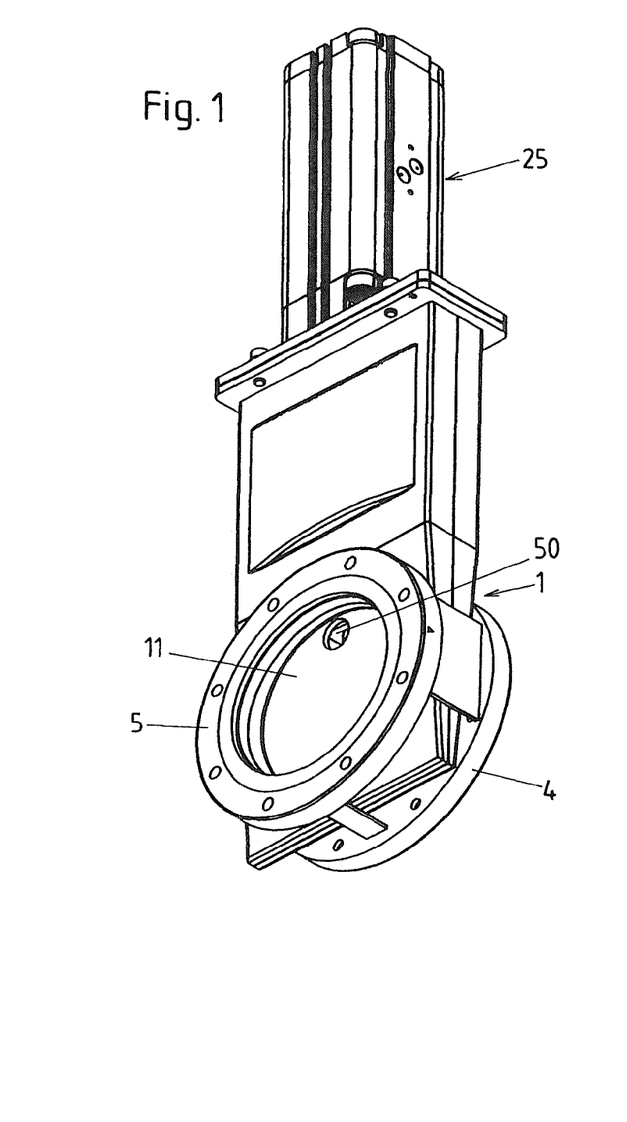
FIG. 1 is a perspective view of a vacuum valve according to the invention in the closed state.
Figure 2:
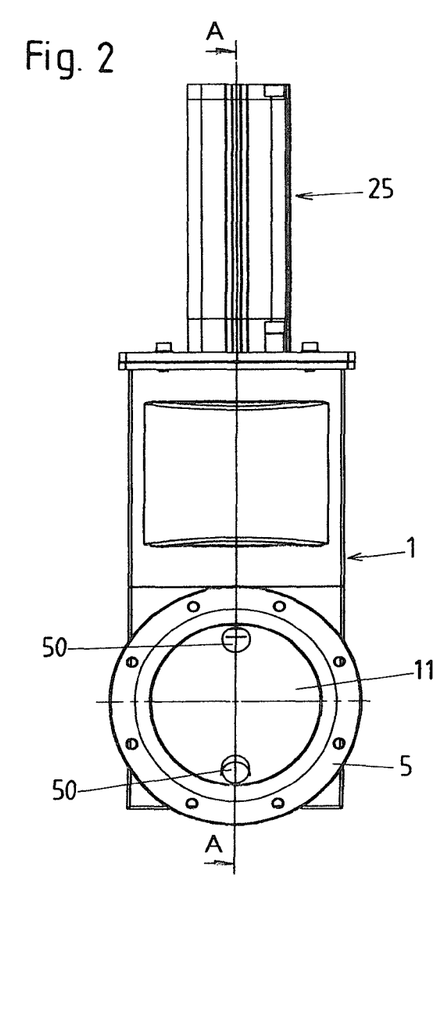
FIGS. 2 and 3 are a front view and a side view of the vacuum valve of FIG. 1.
Figure 3:
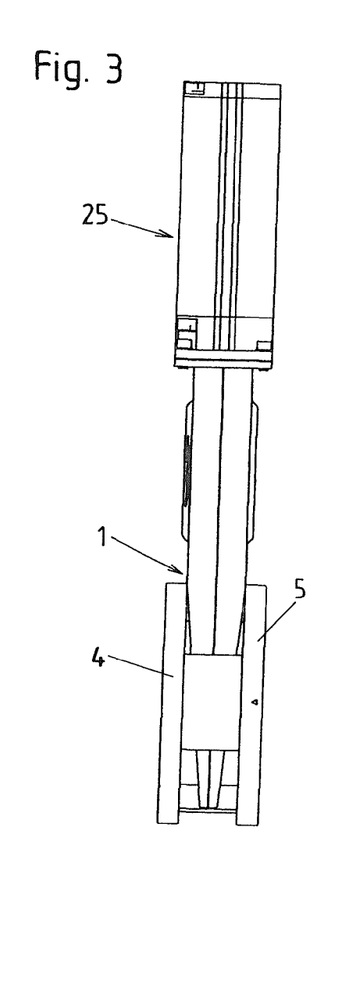
Figure 4:
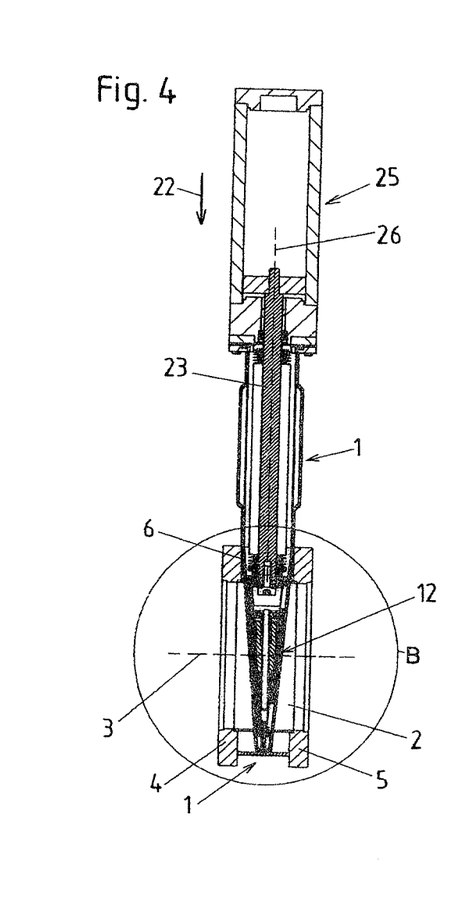
FIG. 4 is a cross-section along a line 4-4 of FIG. 2.
Figure 5:
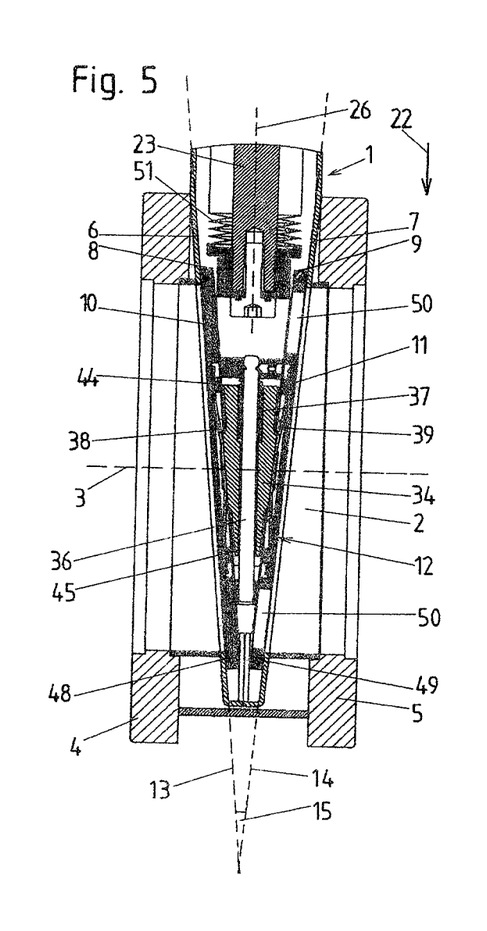
FIG. 5 is an enlarged detail from FIG. 4.

The valve rod 23 is sealed via a bellows 51 (which may be formed, e.g., as a folded bellows or a diaphragm bellows or a Teflon bellows) from the valve housing 1 (which is only drawn in FIGS. 4 and 5). Other seals of the valve rod 23 in reference to the valve housing 1 are also possible, for example by an O-ring arranged between the valve rod 23 and the passage in the valve housing 1 penetrated by the valve rod 23 (=slide passage).

A valve drive 25 serves to open and close the vacuum valve, e.g., for adjusting the closure device 12 between its open position and its closed position, which in the exemplary embodiment shown is formed by a piston-cylinder unit, with the valve rod 23 representing the piston rod of this piston-cylinder unit. The valve rod 23 can be displaced by the valve drive 25 in the direction of its longitudinal axis 26 in order to close the vacuum valve in the closing direction 22, and to open the vacuum valve opposite the closing direction 22.

Two spring elements 27 serve to pull the closure plate 10 and the counter plate 11 against the first and second spreading surface 17, 18 of the spreading unit 16 and hold them in contact thereby, which are arranged in reference to a direction perpendicular to the longitudinal axis 26 of the valve rod 23 and perpendicular to an axis 3 of the passage 2 at both sides of the spreading unit 16. Each of the spring elements 27 comprises a first arm 28 embodied as a flat spring, which is fastened at the closure plate 10, for example by way of welding, and a second arm 29 embodied as a flat spring fastened at the counter plate 11, for example by way of welding. The first and second arms 28, 29 are connected to each other at the frontal end sections in reference to the closing direction 22, for example by screw connections. The first and second arms 28, 29 then extend wedge-shaped away from each other at their connection section.

Instead of the two spring elements 27 shown, more or less spring elements may be provided, in order to pull the closure plate 10 and the counter plate 11 against the spreading unit 16 and they may also be formed in a different manner.

In order to additionally stabilize the mutual position of the closure plate 10 and the counter plate 11 on one side of the spreading unit 16, a connection part 30 is screwed to the closure plate 10 and an equally embodied connection part 31 is screwed to the counter plate 11 at the opposite side of the spreading unit 16. The connection parts 30, 31 each have a keyhole-shaped recess 32, with a pin 33 engaging the narrower section, fastened at the other of the two plates 10, 11, which has a mushroom shaped head. The dimensions of the connection parts 30, 31 and the pin 33 are such that a clear space develops between the head of the respective pin 33 and the recess 32, which allows a spreading apart of the closure plate 10 and the counter plate 11 during the closing of the vacuum valve described in the following.

When assembling the closure device first the heads of the pins 33 are inserted into the enlarged sections of the recesses 32 and then displaced into the sections of the recesses 32 with the narrower width of the slit, with the width of these slits being smaller than the diameter of the head of the pin 33, and subsequently the first and second arms 28, 29 of the spring elements 27 are screwed to each other.

The closure plate 10 and the counter plate 11 are supported by a support part 34 of the closure device 12, which is guided in a displaceable fashion in reference to the spreading unit 16 in the direction of the longitudinal axis 26 of the valve rod 23. For this purpose, the support part 34 is arranged in a first recess 35 of the basic body 21 of the spreading unit 16, and is penetrated by a guiding pin 36 fixed at the basic body 21. At the one side, a spring 37 is arranged on the guiding pin 36, supported at the one side at the support part 34 and at the other side at the basic body 21, pre-stressing the support part 34 in reference to the basic body 21 into a normal position limited by contacting the basic body 21. The support part 34 can be displaced in reference to the basic body 21 against the force of the spring 37 opposite the closing direction 22.

The closing plate 10 and the counter plate 11 are connected to the support part 34 in such a manner that they cannot be displaced in the closing direction 22 or opposite thereto. Here, connection elements 38, 39 serve for this purpose, preferably bendable in a spring-elastic fashion. They are connected to the basic body 21 of the spreading unit 16 in a form-fitting manner by latches 40, 41 of the basic body engaging recesses of the connection elements 38, 39.

The spring-elastic arms of the connection elements 38, 39, projecting from the basic body 21 at both sides of the form-fitting connection, show bore holes 42, 43 with pegs engaging them, arranged at the closure plate 10 and/or the counter plate 11.

Figure 6:
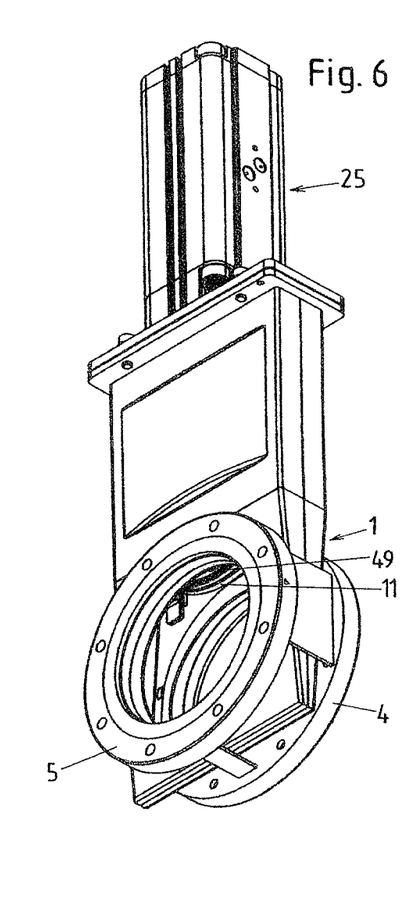
FIG. 6 is a perspective view according to FIG. 1 in the opened state of the vacuum valve.
Figure 7:
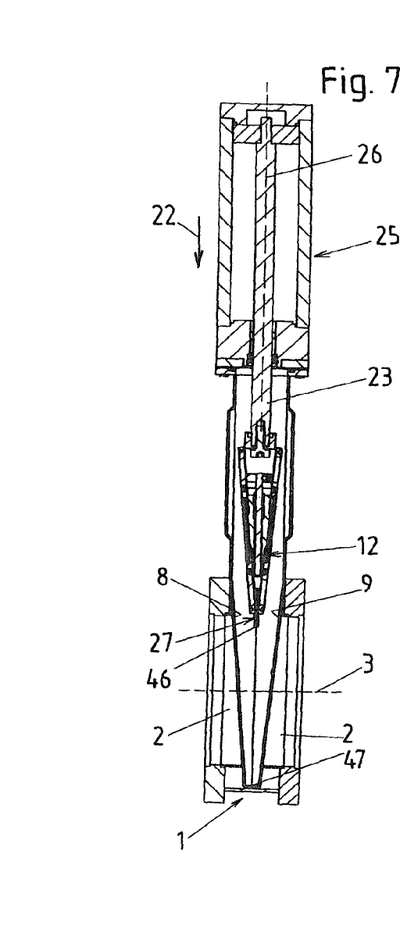
FIG. 7 is a cross-section similar to FIG. 4 in the opened state of the vacuum valve (with the bellows sealing the valve rod from the valve housing being omitted for reasons of simplicity)

In the open state of the vacuum valve the closure device 12 is situated in an open position, in which it releases the passage 2, and the valve rod 23 is situated in a first position (cf. FIGS. 6 and 7).

In order to close the vacuum valve the valve rod 23 is displaced parallel in reference to its longitudinal axis 26 in the closing direction 22. Here, the closure device 12 is inserted into the passage 2 until it assumes an intermediate position in a second position of the valve rod 23 (cf. FIGS. 8 and 9). In this intermediate position the closure plate 10 and the counter plate 11 cover the passage 2, seen in the direction of the axis 3 of the passage 2, however they are still spaced apart from the seat 8 and the counter seat 9. In this second position of the valve rod 23, stops 46 formed by the ends of the spring element 27 located in the front in reference to the closing direction 22, approach the counter stops 47 fixed at the valve housing. In the exemplary embodiment shown these counter stops 47 are formed by sections of a connection section connecting the plate-shaped sections 6, 7 (the stops 46 are drawn in FIGS. 7 and 12-15, the reference character 47 is shown in FIG. 7 for the counter stops).

For example, the stops 46 can also be formed by, in reference to the closing direction 22, frontal ends of the closure plate 10 and the counter plate 11.

From its second position the valve rod 23 is displaced further in the closing direction 22 with any additional displacement of the closure plate 10 and the counter plate 11 in the closing direction 22 now being blocked. This way, the spreading unit 16 is displaced in reference to the closing plate 10 and the counter plate 11 in the closing direction 22, spreading apart the closure plate 10 and the counter plate 11 such that they are pressed against the seat 8 and the counter seat 9. Here, the elastic annular seal 48, arranged at the closure plate 10, is pressed to the sealing surface of the seat 8, hereby sealing the closure plate 10 in reference to the seat 8. Further, the elastic contact ring 49 arranged at the counter plate 11 is pressed to the contact surface of the counter seat 9.

The elastic contact ring 49 may comprise the same material as the seal 48, for example Viton.

In order to achieve a defined pressure status between the closure plate 10 and the counter plate 11, the counter plate 11 is provided with at least one penetrating opening 50.

In the closed state of the vacuum valve the closure device 12 assumes its closing position and the closure plate 10 seals the passage 2 (cf. FIGS. 1 to 5).

By the connection of the closure plate 10 and the counter plate 11 to the support part 34, fixed in reference to the direction of the longitudinal axis 26 of the valve rod 23, the support part 34 is displaced during the displacement of the valve rod 23 from its second position into its third position in reference to the spreading unit 16. While the spreading unit 16 moves further in the closing direction 22 the motion of the support part 34 is blocked in the closing direction 22. The displacement of the support part 34 in reference to the spreading unit 16 occurs here against the force of the spring 37.

Figure 8:
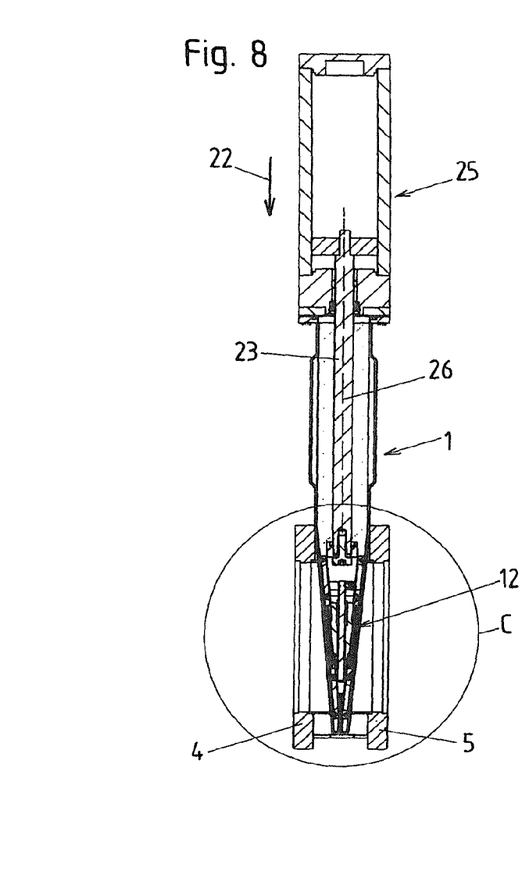
FIG. 8 is a cross-section similar to FIG. 7 in an interim position of the closure device.
Figure 9:
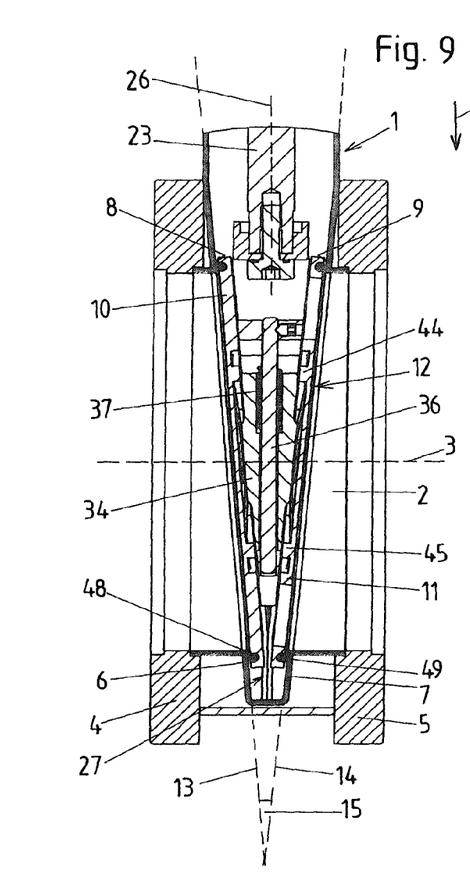
FIG. 9 is an enlarged detail from FIG. 8.
Figure 10:
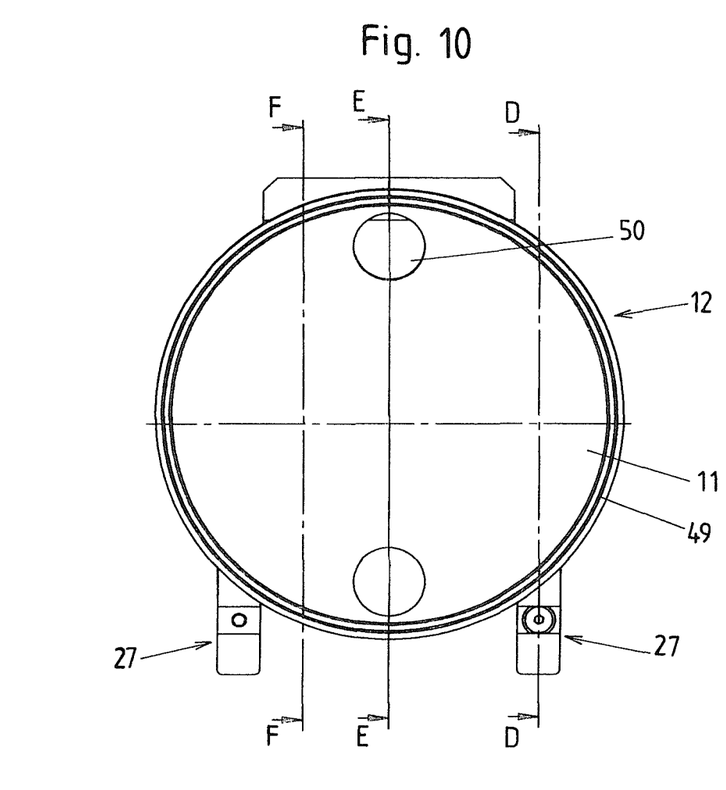
FIGS. 10 a. 11 are the closure device in a front view and a side view.
Figure 11:
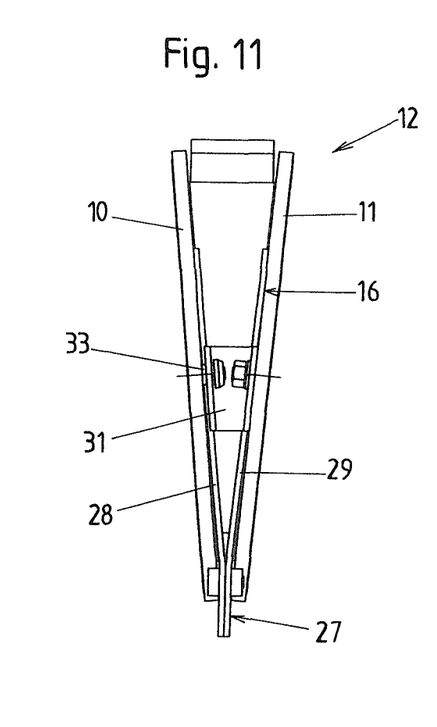
Figure 12:
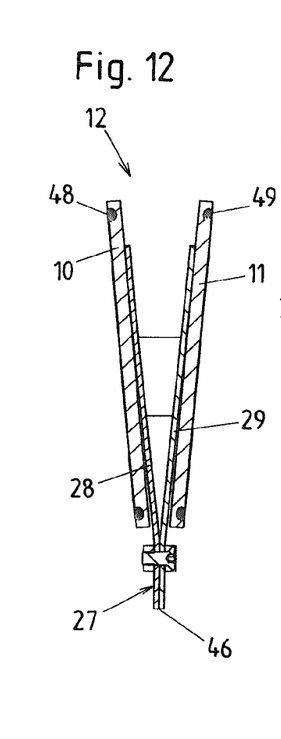
FIGS. 12, 13, 14 are cross-sections along the lines 12-12, 13-13, and 14-14 of FIG. 10.
Figure 13:
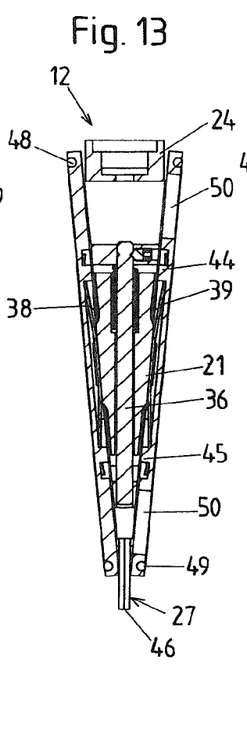
Figure 14:
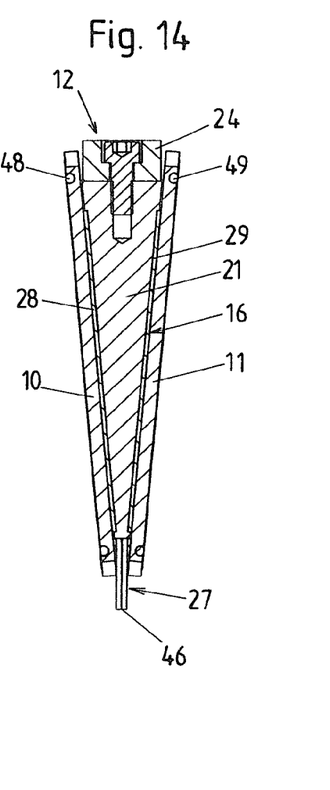
Figure 15:
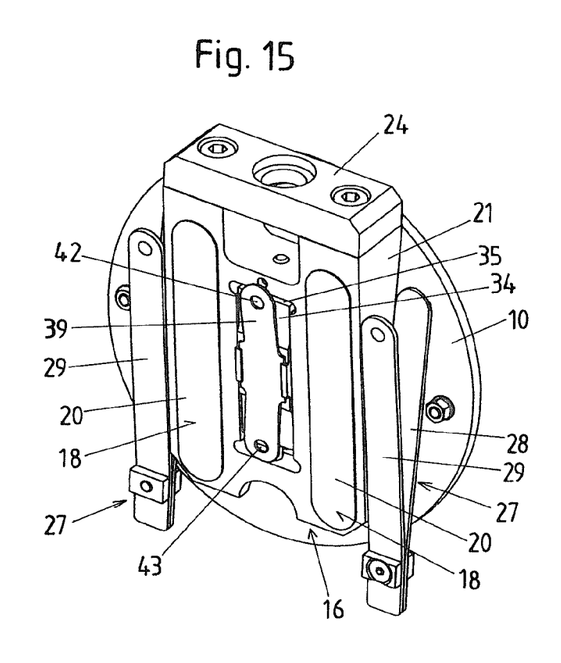
FIG. 15 is the closure device in a perspective view, the counter plate being omitted.
Figure 16:
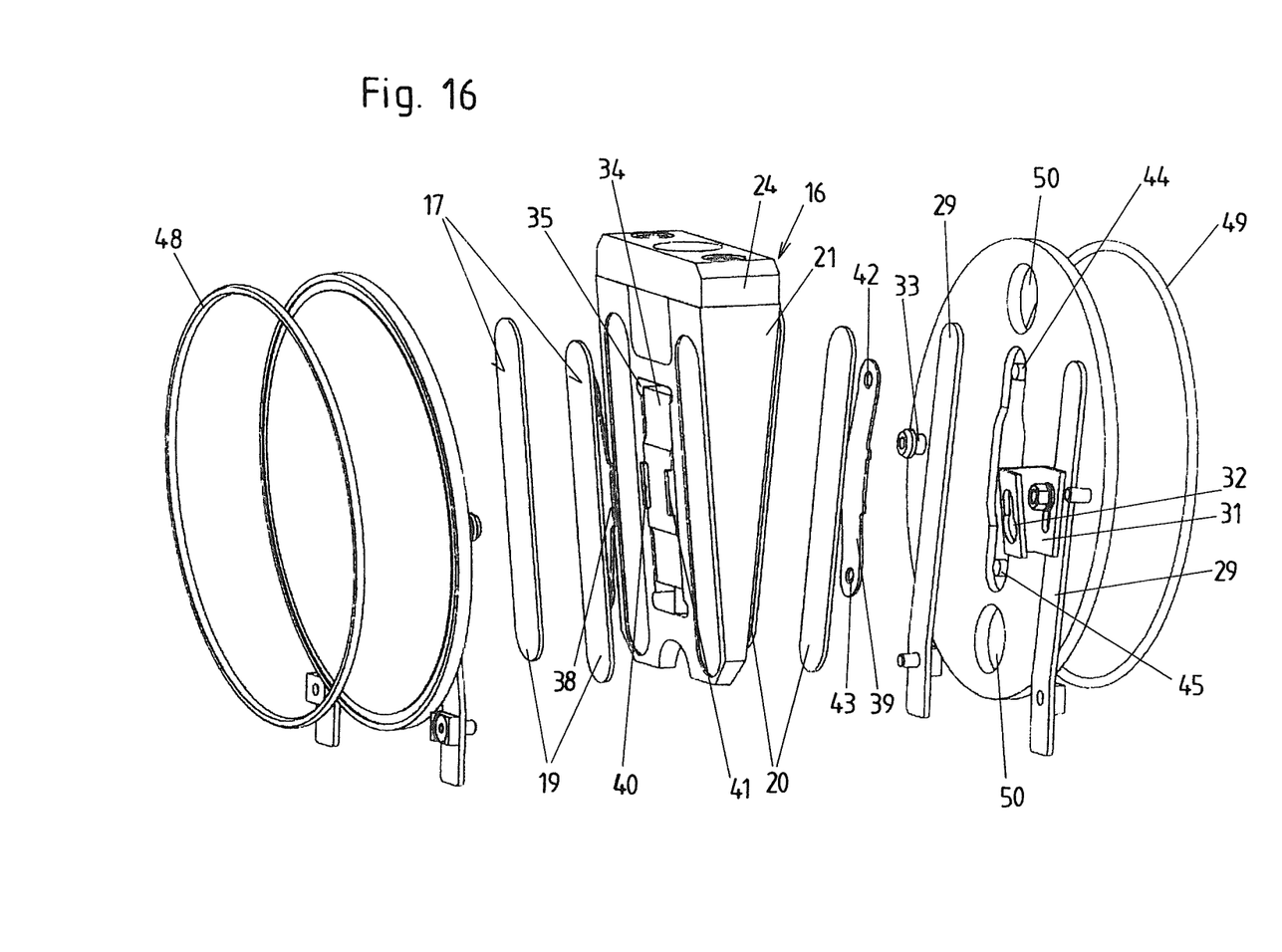
FIGS. 16 a. 17 are exploded views of the closure device from different angles of view.
Figure 17:
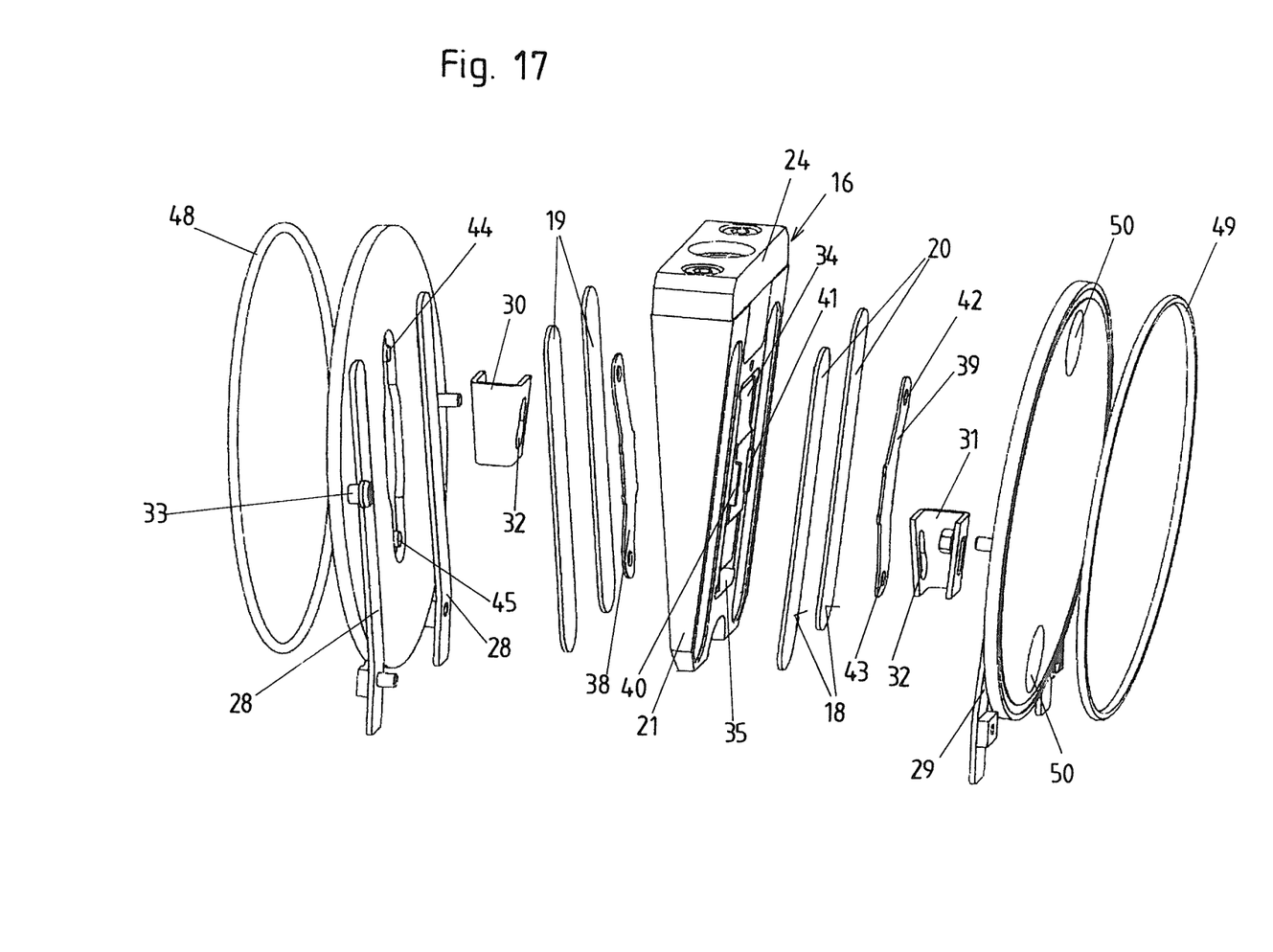

When the vacuum valve is opened again by the valve rod 23 being displaced, starting at its third position against the closing direction 22, the spring 37 keeps at least one stop 46 pressed to at least one counter stop 47 and the spring elements 27 pull back the closure plate 10 and the counter plate 11 from the seat 8 and the counter seat 9 until the closure device 12 once more assumes the intermediate position shown in FIGS. 8 and 9. In a further displacement of the valve rod 23 from its second position into the first position, the closure plate 10 and the counter plate 11 are moved by the spreading unit 16 and the valve rod 23 against the closing direction 22 until the open position of the closure device 12 is reached.

In many applications the vacuum valve is only allowed to be opened when at both sides of the closure device 12 no or only little differential pressure is given. The force applied by the spring elements 27 can then be selected appropriately low.

It may also be provided in the closed position of the closure device 12 for the counter plate 11 to be pressed against the counter seat 9 in a sealing fashion with the counter plate 11 being embodied without any penetrating opening 50. The space between the closure plate 10 and the counter plate 11 could then be provided with an intermediate suction, with the line by which said suction occurs can be closed by a valve. Further, the space between the closure plate 10 and the counter plate 11 may additionally be connected via a valve, which can be blocked, to a vacuum area located at one of the two sides of the closure device in order to allow pressure compensation.

Different modifications of the exemplary embodiment of the present invention shown are possible without departing from the scope of the invention. For example, the support part 34 could be connected fixed in reference to the closing direction 22 only to either the closure plate 10 or the counter plate 11 and the fixed connection to the other of these two plates may be created by the mutual connection of these two plates 10, 11. Separate support parts 34 for the closure plate 10 and the counter plate 11 are also possible. In a further modified embodiment the closure plate 10 and/or the counter plate 11 could be connected via a support part to the spreading unit 16, which in reference to the closure device 22 is connected fixed to the spreading unit 16 and displaceably to the closure plate 10 and/or counter plate 11.

The spring 37 could also be omitted and, when opening the vacuum valve, the stop 46 could be held over the stroke of the valve rod from its third position into its second position or at least over a portion of this path by at least one spring element 27 being connected to the wedge-shaped arrangement of spreading surfaces 17, 18 and the closure plate 10 and the counter plate 11 contacting the counter stop 47.

The seal 48 could also be arranged at the seat 8 and the closure plate 10 may be provided with a sealing surface cooperating therewith.

The elastic contact ring 49 could also be arranged at the counter seat 9 and a contact surface cooperating with it could be arranged at the counter plate 11.

In the exemplary embodiment shown, the closure plate 10 and the counter plate 11 are embodied annularly. Other embodiments are also possible, for example rectangular embodiments.

The gliding inserts 19, 20 of the closure plate 10 and/or the counter plate 11 could also be omitted and the spreading surfaces 17, 18 could be formed directly by the surfaces of the basic body 21. Preferably, in this case gliding inserts may be arranged in the closure plate 10 and/or the counter plate 11, with their surfaces forming contact surfaces or compression surfaces, cooperating with the spreading surfaces 17, 18. In case of the embodiment of the spreading unit 16 with gliding inserts 19, 20, the closure plates 10 and/or counter plates 11 may also be provided with gliding inserts.

Transfer elements may also be arranged between the first spreading surface 17 and the closure plate 10 and/or between the second spreading surface 18 and the counter plate 11 in order to transfer the force applied by the spreading unit 16 upon the closure plate 10 and/or the counter plate 11, by which the closure plate 10 and/or the counter plate 11 are guided parallel in reference to the first spreading surface 17 and/or the second spreading surface 18. Such roller bodies, for example in the form of rolls or spheres, may be arranged in appropriate roller body cages. Any respective roller body cage could be held at a spreading unit 16 or at a closure plate 10 and/or a counter plate 11.

The vacuum valve according to the invention is characterized in a relatively low production of particles when closing and opening the vacuum valve. Long life spans can be achieved in the vacuum valve according to the invention before any service is required, such as the exchange of the seal 48.

LEGEND CONCERNING THE REFERENCE CHARACTERS

1 valve housing
2 passage
3 axis
4 flange
5 flange
6 plate-shaped section
7 plate-shaped section
8 seat
9 counter seat
10 closure plate
11 counter plate
12 closure device
13 first plane
14 second plane
15 angle
16 spreading unit
17 first spreading surface
18 second spreading surface
19 gliding insert
20 gliding insert
21 basic body
22 closing direction
23 valve rod
24 connection part
25 valve drive
26 longitudinal axis
27 spring element
28 first arm
29 second arm
30 connection part
31 connection part
32 recess
33 pin
34 support part
35 recess
36 guide pin
37 spring
38 connection element
39 connection element
40 latch
41 latch
42 bore hole
43 bore hole
44 peg
45 peg
46 stop
47 counter stop
48 seal
49 elastic contact ring
50 penetrating opening
51 bellows

The invention claimed is:

1. A vacuum valve comprising:

a valve housing with a passage having an axis, a seat surrounding the passage located in a first plane, and a counter seat surrounding the passage located in a second plane, with the first and the second plane being arranged wedge-shaped in reference to each other and each being aligned at an angle in reference to the axis of the passage, an adjustable closure device, with an open position in which the passage is released and a closed position in which the passage is sealed, with a closure plate, which in the closed position of the closure device is pressed to the seat, and in the closed position as well as the open position of the closure device is aligned parallel in reference to the first plane, and a counter plate, which in the closed position of the closure device is pressed against the counter seat, and in the closed position as well as the open position of the closure device is aligned parallel in reference to the second plane, a valve rod having a longitudinal axis and carrying the closure device, which for adjusting the closure device from the open position into the closed position and back into the open position, is displaceable in a straight line parallel in reference to the longitudinal axis of the valve rod in a closure direction and opposite the closure direction, wherein the closure device further comprises: a spreading unit between the closure plate and the counter plate, to which the valve rod is fastened, and which for spreading apart the closure plate and the counter plate and for pressing the closure plate to the seat and the counter plate to the counter seat, comprises a first spreading surface aligned parallel in reference to the first plane and a second spreading surface aligned parallel in reference to the second plane and which is displaceable in reference to the closure plate and the counter plate in the closing direction of the valve rod, and at least one support part is guided displaceably in reference to the spreading unit in a direction of the longitudinal axis of the valve rod, and is connected non-displaceably in reference to a direction of the longitudinal axis of the valve rod to at least one of the closure plate or the counter plate, and for adjusting the closure device from the open position into the closed position, the valve rod is displaceable in the closing direction from a first position, in which the closure device is in the open position and releases the passage, to a second position, in which the closure device is inserted into the passage, into a third position, in which the closure device is in the closed position, and during displacement of the valve rod from the first position into the second position, the closure plate and the counter plate are moved with the valve rod in the closing direction, and in the second position of the valve rod, at least one stop of the closure device abuts a counter stop fixed on the valve housing, which during displacement of the valve rod from the second position into the third position blocks any further displacement of the closure plate and the counter plate in the closing direction, and the spreading unit during displacement of the valve rod from the second position into the third position, through displacement of the spreading unit in reference to the closure plate and the counter plate, spreads apart the closure plate and the counter plate and presses them respectively to the seat or the counter seat.

2. A vacuum valve according to claim 1, wherein the first and second spreading surface are formed by gliding inserts on a base body of the spreading unit.

3. A vacuum valve according to claim 1, wherein in the second position of the valve rod, the closure plate is spaced apart from the seat and the counter plate is spaced apart from the counter seat.

4. A vacuum valve comprising:
a valve housing with a passage having an axis, a seat surrounding the passage located in a first plane, and a counter seat surrounding the passage located in a second plane, with the first and the second plane being arranged wedge-shaped in reference to each other and each being aligned at an angle in reference to the axis of the passage,
an adjustable closure device, with an open position in which the passage is released and a closed position in which the passage is sealed, with a closure plate, which in the closed position of the closure device is pressed to the seat, and in the closed position as well as the open position of the closure device is aligned parallel in reference to the first plane, and a counter plate, which in the closed position of the closure device is pressed against the counter seat, and in the closed position as well as the open position of the closure device is aligned parallel in reference to the second plane,
a valve rod having a longitudinal axis and carrying the closure device, which for adjusting the closure device from the open position into the closed position and back into the open position, is displaceable in a straight line parallel in reference to the longitudinal axis of the valve rod in a closure direction and opposite the closure direction,
wherein the closure device further comprises: a spreading unit between the closure plate and the counter plate, to which the valve rod is fastened, and which for spreading apart the closure plate and the counter plate and for pressing the closure plate to the seat and the counter plate to the counter seat, comprises a first spreading surface aligned parallel in reference to the first plane and a second spreading surface aligned parallel in reference to the second plane and which is displaceable in reference to the closure plate and the counter plate in the closing direction of the valve rod, and at least one support part is guided displaceably in reference to the spreading unit in a direction of the longitudinal axis of the valve rod, and is connected non-displaceably in reference to a direction of the longitudinal axis of the valve rod to at least one of the closure plate or the counter plate, and
at least one spring element is provided pulling the closure plate and the counter plate against the spreading unit.

5. A vacuum valve according to claim 4, wherein the spring element comprises a first arm fastened to the closure plate and a second arm fastened to the counter plate, with the first arm and the second arm being connected to each other at frontal end sections, in reference to the closing direction.

6. A vacuum valve according to claim 5, wherein the at least one stop (46) is formed at a frontal end of the at least one spring element, in reference to the closing direction.

7. A vacuum valve according to claim 4, wherein at both sides of the spreading unit, one of the spring elements is arranged pulling each of the closure plate and the counter plate against the spreading unit.

8. A vacuum valve comprising:
a valve housing with a passage having an axis, a seat surrounding the passage located in a first plane, and a counter seat surrounding the passage located in a second plane, with the first and the second plane being arranged wedge-shaped in reference to each other and each being aligned at an angle in reference to the axis of the passage,
an adjustable closure device, with an open position in which the passage is released and a closed position in which the passage is sealed, with a closure plate, which in the closed position of the closure device is pressed to the seat, and in the closed position as well as the open position of the closure device is aligned parallel in reference to the first plane, and a counter plate, which in the closed position of the closure device is pressed against the counter seat, and in the closed position as well as the open position of the closure device is aligned parallel in reference to the second plane,
a valve rod having a longitudinal axis and carrying the closure device, which for adjusting the closure device from the open position into the closed position and back into the open position, is displaceable in a straight line parallel in reference to the longitudinal axis of the valve rod in a closure direction and opposite the closure direction,
wherein the closure device further comprises: a spreading unit between the closure plate and the counter plate, to which the valve rod is fastened, and which for spreading apart the closure plate and the counter plate and for pressing the closure plate to the seat and the counter plate to the counter seat, comprises a first spreading surface aligned parallel in reference to the first plane and a second spreading surface aligned parallel in reference to the second plane and which is displaceable in reference to the closure plate and the counter plate in the closing direction of the valve rod, and at least one support part is guided displaceably in reference to the spreading unit in a direction of the longitudinal axis of the valve rod, and is connected non-displaceably in reference to a direction of the longitudinal axis of the valve rod to at least one of the closure plate or the counter plate, and
the support part is pre-stressed by a spring into a base position and when the vacuum valve is closed it is displaceable against a force of the spring opposite the closing direction in reference to the spreading unit.

* * * * *